United States Patent [19]

Burns et al.

[11] Patent Number: 5,661,210
[45] Date of Patent: Aug. 26, 1997

[54] OPTICALLY CLEAR LIQUID SILICONE RUBBER

[75] Inventors: Gary Thomas Burns; Michael Robert Reiter, both of Midland, Mich.

[73] Assignee: Dow Corning Corporation, Midland, Mich.

[21] Appl. No.: 717,590

[22] Filed: Sep. 25, 1996

[51] Int. Cl.$^6$ .................................................. C08K 3/34
[52] U.S. Cl. ..................... 524/493; 524/789; 524/847; 524/862; 525/478; 525/479; 528/15; 528/43
[58] Field of Search ..................... 528/15, 43; 524/493, 524/789, 847, 862; 525/478, 479

[56] References Cited

U.S. PATENT DOCUMENTS

| | | |
|---|---|---|
| 3,159,601 | 12/1964 | Ashby . |
| 3,220,972 | 11/1965 | Lamoreaux . |
| 3,296,291 | 1/1967 | Chalk et al. . |
| 3,341,490 | 9/1967 | Burdick et al. . |
| 3,419,593 | 12/1968 | Willing . |
| 3,445,420 | 5/1969 | Kookostedes et al. . |
| 3,516,946 | 6/1970 | Modic . |
| 3,624,023 | 11/1971 | Hartlage . |
| 3,814,730 | 6/1974 | Karstedt . |
| 3,928,629 | 12/1975 | Chandra et al. . |
| 3,989,668 | 11/1976 | Lee et al. . |
| 3,996,187 | 12/1976 | Travnicek . |
| 3,996,189 | 12/1976 | Travnicek . |
| 4,418,165 | 11/1983 | Polmanteer et al. . |
| 4,753,978 | 6/1988 | Jensen . |
| 5,036,117 | 7/1991 | Chung et al. . |
| 5,455,313 | 10/1995 | Kurusu et al. ........................ 525/478 |
| 5,548,038 | 8/1996 | Enami et al. ........................ 525/478 |

*Primary Examiner*—Melvyn I. Marquis
*Attorney, Agent, or Firm*—William F. Boley

[57] ABSTRACT

An optically clear platinum-group metal curable liquid silicone rubber composition having good physical properties. The composition comprises a vinyldimethylsiloxy-terminated polydimethyl(diphenyl)siloxane copolymer comprising about 1 to 20 mole percent diphenylsiloxy units and having a viscosity within a range of about 20,000 mPa·s to 100,000 mPa·s at 25° C., vinyldimethylsiloxy-terminated polydimethyl(diphenyl)siloxane copolymer comprising about 1 to 20 mole percent diphenylsiloxy units and having a viscosity within a range of about 50 mPa·s to 10,000 mPa·s at 25° C. and optionally comprising up to about 3 mole percent vinyldimethylsiloxy units, a treated reinforcing silica filler, and curing agents.

20 Claims, No Drawings

OPTICALLY CLEAR LIQUID SILICONE RUBBER

BACKGROUND OF INVENTION

The present invention is an optically clear platinum-group metal curable liquid silicone rubber composition having good physical properties. The composition comprises a vinyldimethylsiloxy-terminated polydimethyl(diphenyl) siloxane copolymer comprising about 1 to 20 mole percent diphenylsiloxy units and having a viscosity within a range of about 20,000 mPa·s to 100,000 mPa·s at 25° C., vinyldimethylsiloxy-terminated polydimethyl(diphenyl) siloxane copolymer comprising about 1 to 20 mole percent diphenylsiloxy units and having a viscosity within a range of about 50 mPa·s to 10,000 mPa·s at 25° C. and optionally comprising up to 3 mole percent vinylmethylsiloxy units, a treated reinforcing silica filler, and curing agents.

Polydimethylsiloxane polymers when cross-linked by common cure mechanisms such as hydrosilation can provide optically clear silicone elastomers. However such silicone elastomers typically have poor physical properties, particularly tear strength. Therefore, it is common practice to use a reinforcing filler such as fumed silica or precipitated silica to improve the physical properties of the silicone elastomers. Due to the difference in the refractive index of the polydimethylsiloxane polymers and the silica filler the resulting elastomer is no longer optically clear, but translucent in appearance.

There is a continuing commercial need for optically clear elastomeric materials for use in applications such as interlayers in safety glass, in pharmaceutical equipment, and in the preparation of gas permeable lenses such as contact lenses. Therefore, considerable effort has been devoted to the development of optically clear silicone elastomers having physical properties suitable for such applications.

One approach to making optically clear silicone elastomers having suitable physical properties, such as tear strength, is to match the index of refraction of the polyorganosiloxane polymers with that of the silica filler by varying the organic substituents of the polyorganosiloxane polymer.

Burdick et al., U.S. Pat. No. 3,341,490, teach peroxide cured blends comprising 60 to 70 parts of a dimethylvinyl-siloxy endblocked copolymer consisting essentially of about 6 to 9 mole percent of methylphenylsiloxy units, about 0.1 to 0.2 mole percent of vinylmethylsiloxy units and the balance essentially dimethylsiloxy units; and 30 to 40 parts of a vinyldimethylsiloxy endblocked copolymer consisting essentially of about 15 to 25 mole percent of vinylmethylsiloxy units and the balance essentially dimethylsiloxy units; and silica reinforcing filler. The blends are reported to be optically clear.

Hartlage, U.S. Pat. No. 3,624,023, teaches a silicone rubber composition vulcanizable at ambient conditions consisting essentially of (A) from 1 to 50 parts by weight of a reinforcing fumed silica treated with bis(trimethylsilyl) amine, (B) hydroxyl end-blocked polymethylphenylsiloxane having from 15 to 45 mole percent phenylsiloxy units selected from the group consisting of diphenylsiloxy units and methylphenylsiloxy units and any remaining units being dimethylsiloxy units and (C) cure components.

Travnicek, U.S. Pat. No. 3,996,187, describes a method were the refractive index of a polydimethyl(diphenyl) siloxane copolymer or a mixture thereof is matched to that of a reinforcing silica filler to provide an optically clear silicone elastomer. The compositions were peroxide cured.

Travnicek, U.S. Pat. No. 3,996,189, teaches platinum cured reinforced silicone elastomers having improved physical properties comprising at least copolymers of aryl siloxanes and alkyl siloxanes in a ratio of aryl to alkyl substituents providing 6 to 16 mole percent aryl chosen to provide a refractive index matched to the index of refraction of a silica filler. Preferably two copolymers are used and each has methyl groups with 6 to 16 mole percent aryl groups. One of the two copolymers contains terminal vinyl groups and the other copolymer containing at least some hydrogen bonded to silicon atoms.

Another approach to making optically clear silicone elastomers having desirable physical properties involves replacing the reinforcing silica filler with a silicone resin as described in Polmanteer, U.S. Pat. No. 3,341,490. Polmanteer teaches peroxide cured optically clear silicone elastomer compositions consisting essentially of (1) 60 to 70 parts of a vinyldimethylsiloxy endblocked copolymer consisting essentially of about 6 to 9 mole percent of methylphenylsiloxy units, and about 0.1 to 0.2 mole percent of vinylmethylsiloxy units, and the balance essentially dimethylsiloxy units, (2) 30 to 40 parts of vinyldimethylsiloxy endblocked copolymer consisting essentially of about 15 to 25 mole percent of methylphenylsiloxy units, and the balance essentially dimethylsiloxy units, and a silicone resin.

Another alternative approach to making optically clear silicone elastomers having desirable physical properties involves making the reinforcing silica filler of a size such that they do not appreciably scatter light as described in Polmanteer et al., U.S. Pat. No. 4,418,165.

The objective of the present invention is to provide a platinum-group metal catalyzed liquid silicone rubber composition having optical clarity and good physical properties. This objective is achieved by the use of a platinum-group metal curable liquid silicone rubber composition comprising two vinyldimethylsiloxy terminated polydimethyl(diphenyl) siloxane copolymer compositions having a mole percent of diphenylsiloxy units and viscosities within defined ranges. The compositions have the good physical properties typically associated with platinum-group metal curing systems and with bimodal polymer systems having differing viscosities. In addition, optical clarity can be achieved over a range of mole percent of diphenylsiloxy units in the copolymers.

SUMMARY OF INVENTION

The present invention is an optically clear platinum-group metal curable liquid silicone rubber composition having good physical properties. The composition comprises a vinyldimethylsiloxy-terminated polydimethyl(diphenyl) siloxane copolymer comprising about 1 to 20 mole percent diphenylsiloxy units and having a viscosity within a range of about 20,000 mPa·s to 100,000 mPa·s at 25° C., vinyldimethylsiloxy-terminated polydimethyl(diphenyl) siloxane copolymer comprising about 1 to 20 mole percent diphenylsiloxy units and having a viscosity within a range of about 50 mPa·s to 10,000 mPa·s at 25° C. and optionally comprising up to about 3 mole percent vinyldimethylsiloxy units, a treated reinforcing silica filler, and curing agents.

DESCRIPTION OF INVENTION

The present invention is an optically clear liquid silicone rubber composition. The composition comprises: (A) 100 weight parts of a base-polymer mixture comprising (I) 60 to 90 weight percent of a vinyldimethylsiloxy-terminated polydimethyl(diphenyl)siloxane copolymer comprising about 1 to 20 mole percent diphenylsiloxy units and having a viscosity within a range of about 20,000 mPa·s to 100,000 mPa·s at 25° C. and (II) 10 to 40 weight percent of a vinyldimethylsiloxy-terminated polydimethyl(diphenyl) siloxane copolymer comprising about 1 to 20 mole percent diphenylsiloxy units and having a viscosity within a range of about 50 mPa·s to 10,000 mPa·s at 25° C. and optionally comprising up to about 3 mole percent vinylmethylsiloxy units, (B) 20 to 60 weight parts of a treated reinforcing silica filler, (C) an amount sufficient to cure the composition of a methylhydrogensiloxane cross-linker, and (D) a platinum-group metal containing catalyst sufficient to promote curing of the composition.

In the present composition the base-polymer mixture (component (A)) comprises 60 to 90 weight percent of (I) vinyldimethylsiloxy-terminated polydimethyl(diphenyl) siloxane copolymer described by the following formula

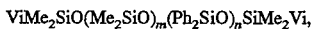

$\text{ViMe}_2\text{SiO}(\text{Me}_2\text{SiO})_m(\text{Ph}_2\text{SiO})_n\text{SiMe}_2\text{Vi}$, where Vi represents vinyl, Me represents methyl, Ph represents phenyl, the mole percent of the $\text{Ph}_2\text{SiO}$ units in the copolymer is within a range of about 1 to 20 as calculated by formula $(n/(m+n))100$, and $m+n$ is such that component (A)(I) has a viscosity within a range of about 20,000 mPa·s to 100,000 mPa·s at 25° C. Preferred is where component (A)(I) comprises about 70 to 80 weight percent of component (A). Preferred is where in component (A)(I) the mole percent of diphenylsiloxy units in the copolymer is within a range of about 5 to 15 mole percent. Even more preferred is when the mole percent of diphenylsiloxy units in component (A)(I) is within a range of about 7 to 10 mole percent. Preferred is when component (A)(I) has a viscosity within a range of about 40,000 mPa·s to 100,000 mPa·s at 25° C. Even more preferred is when component (A)(I) has a viscosity within a range of about 50,000 mPa·s to 60,000 mPa·s at 25° C. Also preferred is when component (A)(I) is a random copolymer. By "random copolymer" it is meant that either individual dimethylsiloxy and diphenylsiloxy units are distributed randomly within each polymer chain or that short blocks comprising multiple dimethylsiloxy units and short blocks comprising multiple diphenylsiloxy units are distributed randomly within the polymer chain.

Component (A) of the present composition also comprises 10 to 40 weight percent of vinyldimethylsiloxy-terminated polydimethyl(diphenyl)siloxane copolymer (component (A) (II)) described by the following formula

$\text{ViMe}_2\text{SiO}(\text{Me}_2\text{SiO})_x(\text{MeViSiO})_y(\text{Ph}_2\text{SiO})_z\text{SiMe}_2\text{Vi}$, where Vi, Me, and Ph are as previously described, the mole percent of the $\text{Ph}_2\text{SiO}$ units in the copolymer is within a range of about 1 to 20 as calculated by formula $(z/(x+y+z))100$, the mole percent of MeViSiO units is within a range of 0 to about 3 as calculated by formula $(y/(x+y+z))100$, and $x+y+z$ is such that component (A)(II) has a viscosity within a range of about 50 mPa·s to 10,000 mPa·s at 25° C. Preferred is where component (A)(II) comprises about 20 to 30 weight percent of component (A). Preferred is where in component (A)(II) the mole percent of $\text{Ph}_2\text{SiO}$ units in the copolymer is within a range of about 5 to 15 mole percent. Even more preferred is when the mole percent of $\text{Ph}_2\text{SiO}$ units in component (A)(II) is within a range of about 7 to 10 mole percent. Preferred is when component (A)(II) has a viscosity within a range of about 250 mPa·s to 5,000 mPa·s at 25° C. Even more preferred is when component (A)(II) has a viscosity within a range of about 500 mPa·s to 5,000 mPa·s at 25° C. Also preferred is where component (A)(II) is a random copolymer as defined above for component (A)(I). Preferred is when the mole percent of vinylmethylsiloxy units in component (A)(II) is zero to about two.

The relative proportions of component (A)(I) and component (A)(II) may be varied within the defined ranges to effect optimal optically clarity and physical properties of the silicone rubber formed from the present compositions. Such optimization can easily be made by those skilled in the art in view of the teachings herein.

The present composition comprises 20 to 60 weight parts of a treated reinforcing silica filler, component (B), for each 100 weight parts of component (A). Preferred is when the present composition comprises 30 to 50 weight parts of component (B). The reinforcing silica filler can be any of those known in the art to be useful for the reinforcement of organosiloxane compositions. Preferred is when the reinforcing silica filler is a precipitated or fumed silica, with fumed silica being most preferred. It is preferred that the treated reinforcing silica filler have a BET surface area greater than about 50 $m^2/g$. More preferred is when the reinforcing silica filler is a fumed silica having a surface area within a range of about 150 $m^2/g$ to 500 $m^2/g$.

The reinforcing silica filler is "treated" with one or more of the known silica treating agents used to prevent a phenomenon typically referred to as "creping" or "crepe hardening" which occurs during the storage and treatment of silica reinforced organosiloxane compositions. The silica treating agent can be any of the low molecular weight organosilicon compounds disclosed in the art as being suitable as such treating agents. The treating agents are typically liquid hydroxy terminated polydiorganosiloxanes containing an average of from 2 to about 20 repeating units per molecule and organosilicon compounds such as hexaorganodisiloxanes and hexaorganodisilazanes that hydrolyze under the conditions used to treat the silica. Examples of such useful treating agents are described in the Example provided herein.

The reinforcing silica filler may be treated with one or more of the treating agents prior to addition to the present composition or may be treated in situ. By "in situ" it is meant that the reinforcing silica filler is treated with the treating agent in the presence of at least a portion of component (A)(I), component (A)(II), or a mixture thereof. Preferred is when the reinforcing silica filler is treated in situ. A preferred method for the in situ treatment of the reinforcing silica filler is described in the Example herein.

The present composition requires the presence of an amount sufficient to cure the composition of a methylhydrogensiloxane crosslinker, component (C). When component (A)(II) contains no pendant vinyl substituents, component (C) must contain an average of at least 3 silicon-bonded hydrogen atoms per molecule. When component (A)(II) contains pendant vinyl substituents, component (C) must contain an average of at least two silicon-bonded hydrogen atoms per molecule. No more than one silicon-bonded hydrogen atom can be bonded per silicon atom, the remaining valences of the silicon atoms are satisfied by divalent oxygen atoms or by methyl radicals. Examples of methylhydrogensiloxanes useful as cross-linkers in the present composition are described, for example, in U.S. Pat. Nos. 3,989,668 to Lee, and 4,753,978 to Jensen, both of which are incorporated herein by reference. The methylhydrogensiloxane crosslinker can be linear, cyclic, or branched siloxane polymers or mixtures thereof.

The amount of component (C) useful in the present composition is that sufficient to cure the composition. Generally, a useful amount of component (C) is that sufficient to provide a ratio of silicon-bonded hydrogen atoms to vinyl substituents provided by component (A) within a range of about 1:10 to 10:1. Preferred is where the ratio of silicon-bonded hydrogen atoms of component (C) to vinyl substituents of component (A) is within a range of about 1:1 to 5:1. More preferred is where the ratio of silicon-bonded hydrogen atoms of component (C) to vinyl substituents of component (A) is within a range of about 1:1 to 2:1.

The present composition comprises a platinum group metal-containing catalyst in an amount sufficient to promote curing of the composition. The platinum group metal-containing catalyst can be any such catalyst which is known to catalyze the reaction of silicon-bonded hydrogen atoms with silicon-bonded alkenyl groups. By "platinum group metal" it is meant ruthenium, rhodium, palladium, osmium, iridium, and platinum. A group of platinum group metal-containing catalysts particularly useful in the present composition are the complexes prepared from chloroplatinic acid as described by Willing, U.S. Pat. No. 3,419,593, which is hereby incorporated by reference to show such complexes and their preparation. A preferred catalyst is a platinum-containing complex which is the reaction product of chloroplatinic acid and sym-divinyltetramethyldisiloxane. Other examples of useful platinum group metal-containing catalysts can be found in U.S. Pat. Nos. 3,989,668 to Lee; 5,036,117 to Chang; 3,159,601 to Ashby; 3,220,972 to Lamoreaux; 3,296,291 to Chalk; 3,516,946 to Modic; 3,814,730 to Karstedt; and 3,928,629 to Chandra all of which are hereby incorporated by reference to show useful platinum group metal-containing catalysts and methods for their preparation.

The amount of platinum group-metal containing catalyst useful in effecting curing of the present composition is not narrowly limited as long as there is a sufficient amount present to accelerate a reaction between the silicon-bonded hydrogen atoms of component (C) and the vinyl substituents of component (A). The appropriate amount of the platinum group metal containing catalyst will depend upon the particular catalyst used. In general as low as about 0.001 part by weight of platinum group metal for every million parts (ppm) by weight of the present composition may be useful (i.e. components (A) through (C)). Preferably the amount of platinum group metal is at least 1 ppm on the same basis. More preferred is at least 1 ppm to about 10,000 ppm platinum group metal, on the same basis.

The present composition may cure rapidly at room temperature. To hinder this curing process an inhibitor may optionally be added to the composition. The inhibitor can be any of those materials known to inhibit the catalytic activity of platinum group metal-containing catalysts. By the term "inhibitor" it is meant a material that retards the room temperature curing of the composition when incorporated in the composition at less than about 10 weight percent of the composition, without preventing the elevated temperature curing of the composition.

Inhibitors of platinum group metal-containing catalysts are well known in the organosilicon art. A preferred class of inhibitors useful in the present composition are acetylenic alcohols as described in Kookootsedes et al., U.S. Pat. No. 3,445,420, which is incorporated herein by reference. Such acetylenic alcohols are exemplified by 1-ethynyl-1-cyclohexanol and 2-methyl-3-butyn-2-ol. Other examples of classes of inhibitors which may be useful in the present composition are described in Chung et al., U.S. Pat. No. 5,036,117, which is incorporated herein by reference.

The amount of inhibitor useful in the present composition is not critical and can be any amount that will retard the platinum group metal-containing catalyst catalyzed reaction of the silicon-bonded hydrogen atoms of component (C) with the vinyl substituents of component (A), while not prevent the reaction at elevated temperatures. The specific amount of inhibitor to be used will depend upon the particular inhibitor, the concentration and type of catalyst, and the nature and amounts of components (A) and (C). Generally, when an inhibitor is used it is preferred that at least one mole of inhibitor be present for each mole of platinum group metal in the composition and that the inhibitor not exceed one weight percent of the composition.

The present composition may contain other components such as mold release agents and colorants, as long as such components do not undesirably effect the optical clarity of the composition.

The present composition can be formed from a two-part system which can cure upon mixing and being subjected to an appropriate temperature. For example, two equal portions comprising components (A) and (B) can be formed and component (D) (platinum group metal-containing catalyst) added to one portion to form a part (A) and component (C) (methylhydrogensiloxane) added to a second portion to form a part B. The present composition can then be formed by combining part A and part B. In addition, a platinum-group metal catalyst inhibitor may be added to part B.

The following examples are provided to illustrate the present invention. The examples are not intended to limit the scope of the claims herein. In the examples all viscosities are given as measured at 25° C.

EXAMPLE 1

Vinyldimethylsiloxy end-blocked polydimethyl(diphenyl)siloxane random copolymers were prepared by the following method. The preparation method is described for a copolymer having a target of 7 mole percent of diphenylsiloxy units (Target Mole % $SiPh_2$), designated as A2 in Table 1. The other copolymers were prepared by a similar method, with the amount of end-blocker being varied to control the copolymer molecular number ($M_n$) and the ratio of dimethylcyclosiloxanes to octaphenylcyclotetrasiloxane being varied to control the mole percent of diphenylsiloxy units in the copolymer.

The procedure for making the copolymer having a Target Mole % of diphenylsiloxy units of 7 mole percent is as follows. To a flask was added 830.7 g of dimethylcyclosiloxanes, 170.1 g of octaphenylcyclotetrasiloxane, and 9.85 g of a vinyldimethylsiloxy end-blocked polydimethylsiloxane comprising 7 dimethylsiloxy units per polymer chain as an end-blocker. This mixture was mixed at 140° C. for 2 hours under flowing nitrogen. Then, 1.96 g of potassium silanolate was added and the content of the flask was allowed to equilibrate about 16 hours at 160° C. under a nitrogen blanket. The temperature was then lowered to 50° C. and 0.186 g of vinyldimethylchlorosilane was added to neutralize the potassium silanolate. After 60 minutes of additional stirring 0.186 g of MgO was added to neutralize chlorides. The content of the flask was stirred for an additional hour and activated carbon added to remove a yellow color present in the mixture. After stirring for one hour an equal volume of toluene was added and the solution filtered. The copolymer mixture was further diluted to 25 weight percent in toluene and precipitated into an equal volume of methanol to remove cyclics. The precipitated process using toluene to dissolve the copolymer and methanol to effect precipitation was performed four times. Solvent was removed from the copolymer at 100° C. under vacuum resulting in a clear fluid. The resulting copolymers were determined to be vinyldimethylsiloxy endblocked polydimethyl(diphenyl)siloxane random copolymers having the properties described in Table 1. The molecular number ($M_n$) and viscosity of each polymer mixture was determined by standard methods. The average mole percent of diphenylsiloxy units (Actual Mole % $SiPh_2$) in the copolymer was determined by $^1$H-NMR. The results of these determinations is provided in Table 1.

The described polymers were also analyzed by $^{29}$Si NMR to confirm that the copolymers were random in nature. Also described in Table 1 are polymers CA and CB which are vinyldimethylsiloxy end-blocked polydimethylsiloxane polymers having the described Mn and viscosity. These polymers were made by conventional methods and used to make compositions for comparison purposes.

TABLE 1

Copolymer Description

| Designation | $M_n$ | Viscosity (mPas · s) | Mole % $SiPh_2$ Target | Mole % $SiPh_2$ Actual |
|---|---|---|---|---|
| CA | 75,500 | 55,000 | 0 | 0.0 |
| A(I)1 | 70,300 | 66,000 | 5 | 5.5 |
| A(I)2 | 71,900 | 86,000 | 7 | 7.6 |
| A(I)3 | 59,200 | 56,000 | 10 | 11.0 |
| A(I)4 | 62,200 | 170,000 | 25 | 25.1 |
| A(I)5 | 79,800 | 1,000,000 | 31 | 31.6 |
| CB | 16,300 | 450 | 0 | 0.0 |
| A(II)1 | 21,700 | 1,300 | 5 | 5.3 |
| A(II)2 | 21,100 | 1,500 | 7 | 7.1 |
| A(II)3 | 21,100 | 2,000 | 10 | 10.5 |
| A(II)4 | 19,100 | 7,400 | 25 | 23.2 |
| A(II)5 | 22,800 | 54,000 | 31 | 35.3 |

The copolymers as described in Table 1 were used to make curable liquid silicone rubber compositions as described in Table 2. To form the compositions described in Table 2 the Component A(I) was matched with a component (A)(II) having the same target value for the mole percent of diphenylsiloxy units. The copolymer combinations are identified in Table 2 by the target mole% of diphenylsiloxy units. The procedure for making each of the liquid silicone rubber compositions was similar to the following. About 94 weight parts of component (A)(I), and all of components (E) and (F) were added to a Baker Perkins mixer and mixed for 10 minutes. Two-thirds of component (G) was added to the mixer and mixing continued for 10 minutes. Component (B) was added in four equal portions with 5 minutes of mixing between the addition of each portion and 10 minutes of mixing after addition of the last portion. The remaining ⅓ of component (G) was added to the mixture with mixing. The mixture was heated at 160° C. for two hours with a vacuum being applied after 30 minutes of heating. After two hours of heating the vacuum was stopped, cooling initiated, and the remaining 6 weight parts of component (A)(I) slowly added to the mixer with mixing. Then over a 15 minute period component (A)(II) was added to the mixer with mixing. Components (C), (I), and (H) were added to the mixer over an additional 5 minute period with mixing and mixing continued for an additional 10 minutes. The resulting liquid silicone rubber base composition was removed from the mixer and stored for subsequent addition of the platinum catalyst, curing, and testing of physical properties.

TABLE 2

LSR Compositions Tested

| Component | Weight Parts | Component Description |
|---|---|---|
| A(I) | 70 | CA/A(I)1–5 |
| A(II) | 30 | CB/A(II)1–5 |
| B | 42.8 | Fumed silica with surface area of 400 m²/g |
| C | 2.6 | Methylhydrogensiloxane crosslinker having a viscosity of 5 mPa · s and 0.76 weight percent of hydrogen atoms bonded to silicon atoms |
| D | 0.17 | Complex of chloroplatinic acid with sym-divinyltetramethyldisiloxane comprising 0.46 weight percent platinum |
| E | 2.0 | Water |
| F | 1.1 | Hydroxy end-terminated polyvinylmethyl-(dimethyl)siloxane comprising 9 to 12 weight percent vinyl radicals and having a viscosity of 40 mPa · s |
| G | 15.1 | Hexamethyldisilazane |
| H | 1.4 | Hydroxy end-terminated polydimethylsiloxane having a viscosity of 40 mPa · s |
| I | 0.04 | 2-Methyl-3-butyn-2-ol |

The liquid silicon rubber base compositions as described above were prepared for curing by mixing in component (D) (platinum catalyst) on a 2-roll mill and degassing under vacuum for 30 minutes. Samples were prepared for physical properties testing by curing at 150° C. for 5 minutes and post curing at 200° C. for 3 hours. The extrudability of catalyzed liquid silicone rubber compositions were tested by extruding through a 3.2 mm diameter orifice of a die at a pressure of 620 kPa. Other physical properties were performed by standard test methods as reported in Table 3. The results of the physical property testing are described in Table 4.

TABLE 3

Physical Property Test Methods

| Physical Property | Test Method |
|---|---|
| Elongation (%) | ASTM D412 |
| Tensile (MPa) | ASTM D412 |
| Modulus 100% (MPa) | ASTM D412 |
| Tear Die B (kN/m) | ASTM D624 |
| Compression Set (%) | ASTM D395 (22 h AT 177° C.) |
| Durometer (Shore A) | ASTM 2240 |
| Resilience (%) | ASTM D2632 |
| Transmission (%) | ASTM D1003-61 |
| Haze Value | ASTM D1003-61 |

TABLE 4

Physical Properties

| Target % $SiPh_2$ | 0 | 5 | 7 | 10 | 20 | 30 |
|---|---|---|---|---|---|---|
| Extrusion rate (g/min) | 56 | 51 | 48 | 44 | 7.3 | 0.7 |
| Elongation (%) | 420 | 368 | 383 | 373 | 376 | 423 |
| Tensile (MPa) | 7.93 | 8.19 | 8.67 | 8.23 | 7.87 | 9.02 |
| Modulus 100% (MPa) | 1.68 | 1.50 | 1.57 | 1.59 | 1.74 | 1.63 |
| Tear Die B (kN/m) | 25.9 | 29.2 | 27.8 | 30.8 | 29.4 | 37.89 |
| Compression Set (%) | 27 | 16 | 12 | 20 | 24 | 14 |
| Durometer (Shore A) | 57 | 54 | 54 | 51 | 58 | 61 |
| Resilience (%) | 40 | 44 | 42 | 33 | 24 | 16 |

TABLE 4-continued

Physical Properties

| Target % SiPh$_2$ | 0 | 5 | 7 | 10 | 20 | 30 |
|---|---|---|---|---|---|---|
| Transmission (%) | 86 | 93 | 94 | 94 | 82 | 70 |
| Haze Value | 75 | 8.5 | 2.8 | 2.2 | 34 | 64 |

EXAMPLE 2

A composition comprising as component A(I) a vinyldimethylsiloxy end-blocked polydimethyl(diphenyl)siloxane random copolymer comprising 8.2 mol % diphenylsiloxy units and having a viscosity of 85,000 mPa·s and as component A(II) a vinyldimethylsiloxy end-blocked poly(vinylmethyl)dimethyldiphenylsiloxane copolymer comprising 7.1 mol % diphenylsiloxy units, 2 mol % vinylmethylsiloxy units, and having a viscosity of 1,500 mPa·s at 25° C. was prepared. A method similar to that described in example 1 for preparing the copolymers was used, with the exception that the preparation of component A(II) further comprised the addition of polyvinylmethylcyclosiloxanes.

The viscosity of each copolymer was determined by standard methods and is provided in Table 5. The average mole percent of diphenylsiloxy units in each copolymer was determined by 1H-NMR and is provided in Table 5.

The copolymers as described in Table 5 were used to prepare the composition described in Table 5 by the following procedure. About 55 weight parts of component (A)(I) and all of component (E) were added to a Baker Perkins mixer and mixed for 5 minutes. All of component (F) and ⅔ of component (G) were added to the mixer and mixing continued for 5 minutes. One-third of component (B) was added in three equal portions with 5 minutes of mixing between the addition of each portion and with the remaining ⅓ of component (G) being added between the second and third additions of component (B). Mixing was continued for 10 minutes and the resulting composition heated at 160° C. under vacuum. After 1.5 hours of heating the vacuum was stopped, cooling initiated, and the remaining 15 weight parts of component (A)(I) slowly added to the mixer with mixing. Then, over a 10 minute period component (A)(II) was added to the mixer with mixing. Components (C), (I), and (H) were added to the mixer over an additional 5 minute period with mixing and mixing continued for an additional 10 minutes. The resulting liquid silicone rubber base composition was removed from the mixer and stored for subsequent addition of the platinum catalyst, curing, and testing of physical properties.

TABLE 5

LSR Composition Tested

| Component | Weight Parts | Component Description |
|---|---|---|
| A(I) | 70 | Vinyldimethylsiloxy end-blocked polydimethyl(diphenyl)siloxane copolymer comprising 8.2 mole percent (mol %) diphenylsiloxy units and having a viscosity of 85,000 mPa · s |
| A(II) | 30 | Vinyldimethylsiloxy end-blocked poly(vinylmethyl)dimethyldiphenylsiloxane copolymer comprising 7.1 mol % diphenylsiloxy units, 2 mol % vinylmethylsiloxy units and having a viscosity of 1,500 mPa · s |
| B | 43 | Fumed silica, BET surface area of 400 m$^2$/g |
| C | 2.5 | Methylhydrogensiloxane crosslinker having a viscosity of 5 mPa · s at 25° C. and 0.76 weight percent of hydrogen atoms bonded to silicon |
| D | 0.13 | Complex of chloroplatinic acid with sym-divinyltetramethyldisiloxane comprising 0.46 weight percent platinum |
| E | 1.9 | Water |
| F | 0.36 | Sym-divinyltetramethyldisilazane |
| G | 15 | Hexamethyldisilazane |
| H | 0.20 | Hydroxy end-terminated polydimethylsiloxane having a viscosity of 40 mPa · s |
| I | 0.03 | 1-Ethynyl-1-cyclohexanol |

The liquid silicon rubber base composition described in Table 5 was prepared for curing by mixing in component (D) (platinum catalyst) on a 2-roll mill and degassed under vacuum for 30 minutes. Samples were prepared for physical properties testing by curing at 150° C. for 5 minutes and post curing at 200° C. for 4 hours. The extrudability of the catalyzed liquid silicone rubber composition was determined as described in Example 1. The physical properties of non-post cured and post-cured samples were tested by the test methods described in Table 3 and the results are described in Table 6.

TABLE 6

Physical Properties

| Physical Property | Non-Post-Cured | Post-Cured |
|---|---|---|
| Durometer (Shore A) | 42 | 48 |
| Elongation (%) | 573 | 401 |
| Tensile (MPa) | 10.89 | 9.67 |
| Modulus 100% (MPa) | 0.91 | 1.33 |
| Tear Die B (kN/m) | 36.8 | 30.5 |
| Compression Set (%) | 53 | 14 |
| Transmission (%) | 93 | — |
| Haze Value | 2.1 | — |

EXAMPLE 3

A composition comprising as component (A)(I) a vinyldimethylsiloxy end-blocked polydimethyl(diphenyl)siloxane random copolymer comprising 8.5 mol % diphenylsiloxy units and having a viscosity of 85,000 mPa·s and as component (A)(II) a vinyldimethylsiloxy end-blocked poly(vinylmethyl)dimethyldiphenylsiloxane comprising 8.5 mol % diphenylsiloxy units, 2 mol % vinylmethylsiloxy units and having a viscosity of 780 mPa·s was prepared. A method similar to that described in Example 1 for preparing the copolymers was used, with the exception that the preparation of component (A)(II) further comprised the addition of polyvinylmethylcyclosiloxanes.

The viscosity of each copolymer was determined by the methods described in Example 1. The copolymers were used to prepare the composition described in Table 7 by the following procedure. About 60 weight parts of component (A)(I) and all of components (E) and (F) were added to a Baker Perkins mixer and mixed for 10 minutes. All of component (G) and ⅓ of component (H) were added to the mixer and mixing continued for 3 minutes. One-third of component (B) was added and mixing continued for 7 minutes. One-third of component (H) was added and mixing continued for 3 minutes. One-third of component (B) was added with an additional mixing for 7 minutes followed by the remaining ⅓ of component (B) and mixing for 7 minutes. The remaining ⅓ of component (H) was added and mixing continued for 15 minutes. The resulting composition was heated at 160° C. under vacuum. After 1.5 hours of heating the vacuum was stopped, the composition cooled, and the remaining 28 weight parts of component (A)(I) slowly added to the mixer with mixing. Then, over a 7 minute period component (A)(II) was added to the mixer with mixing. Components (C), (I), and (J) were added to the mixer and mixing continued for 10 minutes. The resulting liquid silicone rubber base composition was removed from the mixer and stored for subsequent addition of the platinum catalyst, curing, and testing of physical properties.

TABLE 7

LSR Composition Tested

| Component | Weight Parts | Component Description |
| --- | --- | --- |
| A(I) | 88 | Vinyldimethylsiloxy end-blocked polydimethyl(diphenyl)siloxane copolymer comprising 8.5 mol % diphenylsiloxy units and having a viscosity of 85,000 mPa · s |
| A(II) | 12 | Vinyldimethylsiloxy end-blocked poly(vinylmethyl)dimethyldiphenylsiloxane copolymer comprising 8.5 mol % diphenylsiloxy units, 2 mol % vinylmethylsiloxy units and having a viscosity of 780 mPa · s |
| B | 43 | Fumed silica, BET surface area of 400 m²/g |
| C | 2.6 | Methylhydrogensiloxane having a viscosity of 16 mPa · s and comprising 0.8 weight percent of hydrogen atoms bonded to silicon |
| D | 0.18 | Complex of chloroplatinic acid with sym-divinyltetramethyldisiloxane comprising 0.46 weight percent platinum |
| E | 1.9 | Water |
| F | 0.15 | Hydroxy end-terminated poly(vinylmethyl)-dimethylsiloxane comprising 1 to 12 weight percent vinyl radicals and having a viscosity of 40 mPa · s |
| G | 0.36 | Sym-divinyltetramethyldisilazane |
| H | 15 | Hexamethyldisilazane |
| I | 0.78 | Hydroxy end-terminated polydimethylsiloxane having a viscosity of 40 mPa · s |
| J | 0.02 | 1-Ethynyl-1-Cyclohexanol |

The liquid silicon rubber base composition described in Table 7 was prepared for curing by mixing in component (D) (platinum catalyst) on a 2-roll mill and degassed under vacuum for 30 minutes. Samples were prepared for physical properties testing by curing at 150° C. for 5 minutes and post-curing at 200° C. for 4 hours. The extrudability of the catalyzed liquid silicone rubber composition was determined as described in Example 1. The physical properties of non-post cured and post-cured samples were tested by the test methods described in Table 3 and the results are described in Table 8.

TABLE 8

Physical Properties

| Physical Property | Non-Post-Cured | Post-Cured |
| --- | --- | --- |
| Durometer (Shore A) | 55 | 64 |
| Elongation (%) | 583 | 393 |
| Tensile (MPa) | 10.06 | 9.42 |
| Modulus 100% (MPa) | 2.22 | 3.01 |

TABLE 8-continued

Physical Properties

| Physical Property | Non-Post-Cured | Post-Cured |
| --- | --- | --- |
| Tear Die B (kN/m) | 59.5 | 45.9 |
| Compression Set (%) | 46 | 15 |
| Transmission (%) | 94 | — |
| Haze Value | 4.7 | — |

We claim:

1. An optically clear liquid silicone rubber composition comprising:
   (A) 100 weight parts of a base-polymer mixture comprising (I) 60 to 90 weight percent of a vinyldimethylsiloxy-terminated polydimethyl(diphenyl)siloxane copolymer comprising about 1 to 20 mole percent diphenylsiloxy units and having a viscosity within a range of about 20,000 mPa·s to 100,000 mPa·s at 25° C. and (II) 10 to 40 weight percent of a vinyldimethylsiloxy-terminated polydimethyl(diphenyl)siloxane copolymer comprising about 1 to 20 mole percent diphenylsiloxy units and having a viscosity within a range of about 50 mPa·s to 10,000 mPa·s at 25° C. and optionally comprising up to about 3 mole percent vinyldimethylsiloxy units,
   (B) 20 to 60 weight parts of a treated reinforcing silica filler,
   (C) an amount sufficient to cure the composition of a methylhydrogensiloxane crosslinker, and
   (D) a platinum-group metal containing catalyst sufficient to promote curing of the composition.

2. A composition according to claim 1, where component (A)(I) comprises about 70 to 80 weight percent of component (A).

3. A composition according to claim 1, where component (A)(I) comprises about 5 to 15 mole percent of diphenylsiloxy units.

4. A composition according to claim 1, where component (A)(I) comprises about 7 to 10 mole percent of diphenylsiloxy units.

5. A composition according to claim 1, where component (A)(I) has a viscosity within a range of about 40,000 mPa·s to 100,000 mPa·s at 25° C.

6. A composition according to claim 1, where component (A)(I) has a viscosity within a range of about 50,000 mPa·s to 60,000 mPa·s at 25° C.

7. A composition according to claim 1, where component (A)(I) is a random copolymer.

8. A composition according to claim 1, where component (A)(II) comprises about 20 to 30 weight percent of component (A).

9. A composition according to claim 1, where component (A)(II) comprises about 5 to 15 mole percent of diphenylsiloxy units.

10. A composition according to claim 1, where component (A)(II) comprises about 7 to 10 mole percent of diphenylsiloxy units.

11. A composition according to claim 1, where component (A)(II) has a viscosity within a range of about 250 mPa·s to 5,000 mPa·s at 25° C.

12. A composition according to claim 1, where component (A)(II) has a viscosity within a range of about 500 mPa·s to 5,000 mPa·s at 25° C.

13. A composition according to claim 1, where component (A)(II) comprises zero to about two mole percent of vinylmethylsiloxy units.

14. A composition according to claim 1 comprising 30 to 50 weight parts of component (B) per each 100 weight parts of component (A).

15. A composition according to claim 1, where the reinforcing silica filler comprising component (B) is a fumed silica having a surface area within a range of about 150 m²/g to 500 m²/g.

16. A composition according to claim 1, where the ratio of silicon-bonded hydrogen atoms provided by component (C) to vinyl substituents provided by component (A) is within a range of about 1:10 to 10:1.

17. A composition according to claim 1, where the ratio of silicon-bonded hydrogen atoms provided by component (C) to vinyl substituents provided by component (A) is within a range of about 1:1 to 5:1.

18. A composition according to claim 1, where the ratio of silicon-bonded hydrogen atoms provided by component (C) to vinyl substituents provided by component (A) is within a range of about 1:1 to 2:1.

19. A composition according to claim 1, where the platinum-group metal containing catalyst comprises the reaction product of chloroplatinic acid and sym-divinyltetramethyldisiloxane.

20. An optically clear liquid silicone rubber composition comprising:

(A) 100 weight parts of a base-polymer mixture comprising (I) 70 to 80 weight percent of a vinyldimethylsiloxy-terminated polydimethyl(diphenyl)siloxane random copolymer comprising about 7 to 10 mole percent diphenylsiloxy units and having a viscosity within a range of about 50,000 mPa·s to 60,000 mPa·s at 25° C. and (II) 20 to 30 weight percent of a vinyldimethylsiloxy-terminated polydimethyl(diphenyl)siloxane random copolymer comprising about 7 to 10 mole percent diphenylsiloxy units and having a viscosity within a range of about 500 mPa·s to 5,000 mPa·s at 25° C. and optionally comprising zero to about 2 mole percent vinyldimethylsiloxy units, (B) 30 to 50 weight parts of a fumed silica having a surface area within a range of about 150 m²/g to 500 m²/g, (C) a methylhydrogensiloxane crosslinker providing a ratio of silicon-bonded hydrogen atoms to vinyl substituents provided by component (A) within a range of about 1:1 to 2:1, and (D) an amount of a reaction product of chloroplatinic acid and sym-divinyltetramethyldisiloxane sufficient to promote curing of the composition.

* * * * *